United States Patent [19]

Bachman

[11] Patent Number: 4,912,464
[45] Date of Patent: Mar. 27, 1990

[54] ANCHOR ALARM FOR BOATS AND THE LIKE

[76] Inventor: Donald H. Bachman, 151 Cortland St., Lindenhurst, N.Y. 11757

[21] Appl. No.: 311,990
[22] Filed: Feb. 17, 1989
[51] Int. Cl.⁴ .............................................. H04B 13/02
[52] U.S. Cl. .................................. 340/850; 181/140; 367/141; 340/986; 114/293
[58] Field of Search ................ 367/141, 191; 340/850, 340/986; 181/140; 114/294, 293, 304; 200/61.44

[56] References Cited

U.S. PATENT DOCUMENTS

| | | | |
|---|---|---|---|
| 3,428,942 | 2/1969 | Isaacson | 340/986 |
| 4,324,135 | 4/1982 | Peyton | 367/148 |
| 4,651,139 | 3/1987 | Oettli | 340/986 |

Primary Examiner—Charles T. Jordan
Assistant Examiner—J. Woodrow Eldred
Attorney, Agent, or Firm—Richard L. Miller

[57] ABSTRACT

A motion detector is physically attached to a boat's anchor. Upon abnormal motion or movement of the anchor, indicative of a dragging anchor, a pulse generator is initiated by the motion detector to actuate a transmitting transducer and generate an acoustic or sonar wave in the water. The acoustic wave is sensed by a receiving transducer on the boat, and a warning alarm is produced. In a preferred embodiment, the receiving transducer actuates an RF transmitter which generates a radio wave, and an RF receiver which is tuned to receive the radio wave actuates the alarm.

8 Claims, 2 Drawing Sheets

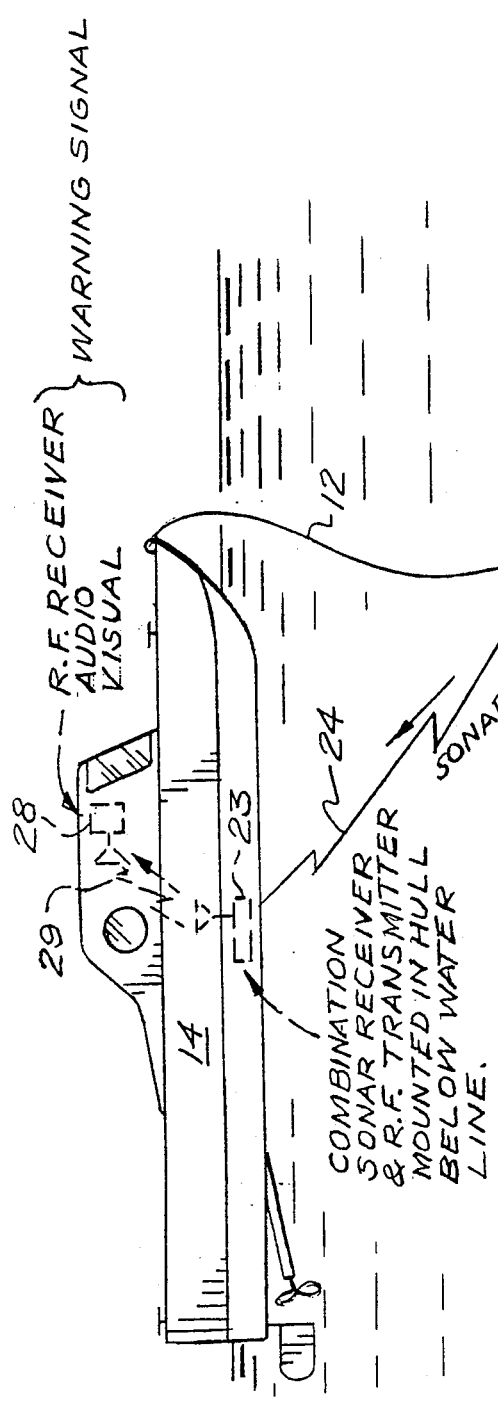
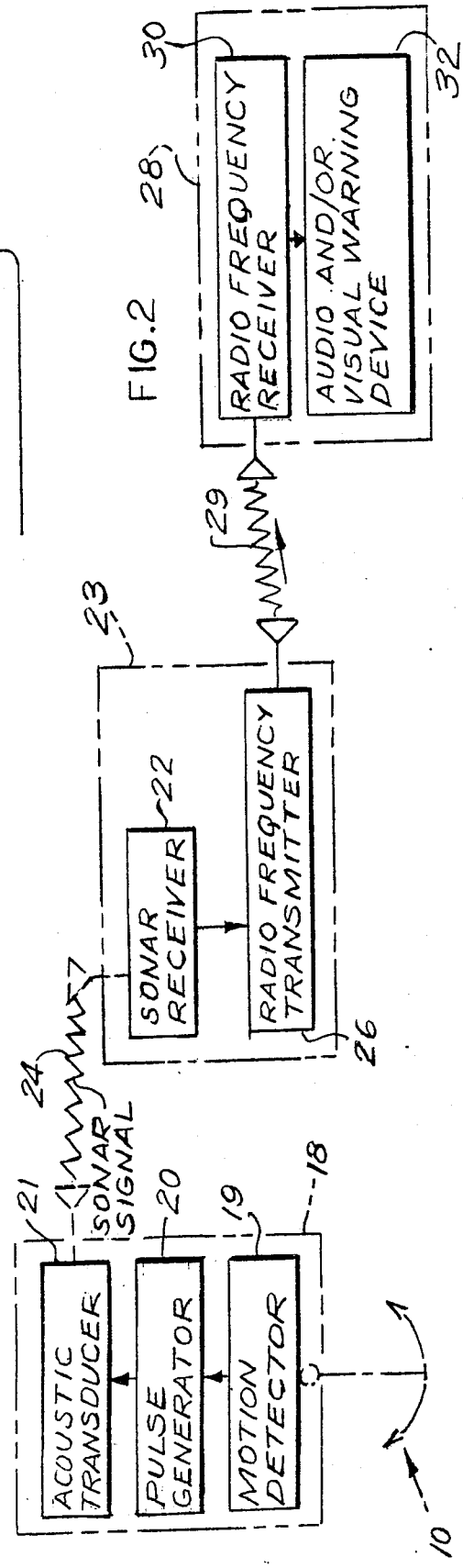

ANCHOR ALARM FOR BOATS AND THE LIKE

BACKGROUND OF THE INVENTION

1. Field of the Invention

This invention relates to a motion detection system for boats, and particularly to the use of a motion detector mounted on an anchor for detecting dragging of the anchor. A sonar wave is generated when the anchor drags, and an alarm on the boat is actuated when the sonar signal is received. In one embodiment, an RF signal is produced to actuate the alarm.

2. Description of the Prior Art

When it is desired to maintain a boat in a specific position in the water, an anchor attached to an anchor line is dropped into the water to engage the bottom. The anchor flukes engage or dig into the bottom to secure the boat, and absent unusual conditions the boat will be held in the desired position with little or no drift. However high winds, turbulent seas or shifts in tide or current often cause the anchor to free itself from the bottom, and to drag along the bottom at the end on the anchor line. When this occurs, the boat is no longer secure, and is subject to random drifting, a situation which is potentially dangerous. It is desirable to warn the crew or a responsible person when the anchor is no longer secure on the bottom so that corrective action may be taken.

A number of prior art devices or systems attempt to solve the problem of a dragging anchor by sounding an alarm when an anchor becomes disengaged from the bottom. Many of these devices or systems require the use of a secondary or auxiliary anchor or weight attached to a separate line and dropped to the bottom from the boat, movement of the boat in relation to the auxiliary anchor being sensed and an alarm actuated in response thereto. One example of this type of warning system is shown in U.S. Pat. No. 3,727,212 to Jones, in which a weight is secured via a line to a vertically extending control arm, and the weight is dropped to the bottom. Any movement of the control arm actuates an alarm. Control systems of this type are often oversensitive to tide shifts, insensitive to slow drift, and heavy and bulky.

Another type of anchor-dragging alarm is described in U.S. Pat. No. 3,579,182 to Schneider, in which an anchor-mounted electrical switch is actuated when the anchor shank inclines itself vertically rather than the usual horizontal position it assumes when embedded in the bottom. Conducting wires extend from the anchor-mounted switch through tubing tied together with the anchor line. An electrical signal is passed from the switch through the conducting wires to an alarm on the boat when the anchor deviates substantially from the horizontal. A disadvantage of this type of system is the need for relatively fragile electrical wires extending from the anchor to the boat, and the possibility of damage to the conductors. This signal upon movement or dragging of the anchor.

Another anchor drag indicator is shown in U.S. Pat. No. 3,831,139 to Hennessey, wherein a motion responsive floating shell containing an electrical switch produces an electrical output signal when disturbed from its normal orientation. This device requires electrical power to be supplied to it, and also requires that the output electrical signal be fed through wires to the boat.

It is an object of this invention to provide an anchor alarm system for boats which senses dragging of the anchor and which eliminates the need for electrical connection between the anchor and the boat.

A further object of this invention is a motion sensor for boat anchors which produces an acoustic signal in the water upon motion of the anchor.

A still further object of this invention is a boat alarm system in which receipt of an acoustic signal indicative of movement of the anchor initiates an RF radio signal which may be received and used to trigger an alarm on the boat and/or at a remote location.

SUMMARY OF THE INVENTION

In accordance with a preferred embodiment of the present invention, a self-contained motion sensor together with an associated acoustic wave generating device, an electrical power supply and required circuitry is affixed to an anchor, the anchor being connected via a line to a boat. After deployment of the anchor to the bottom, the motion sensor produces an electrical signal upon a significant movement of the anchor. A pulse generating circuit adapted to produce pulses of relatively low frequency is actuated by the electrical signal from the motion sensor, and the pulses are fed to an acoustic transmitting transducer to produce an acoustic or sonar signal which is propagated through the water. An acoustic receiving transducer on the boat is tuned to receive the acoustic pulses and respond thereto by actuating an alarm. In one embodiment of this invention, the receiving transducer actuates the alarm directly, while in a second embodiment the receiving transducer actuates an RF transmitter to cause generation of an electro-magnetic radio wave which may be sensed by an RF receiver tuned to the appropriate wavelength. The receiver may be located on the boat, or located remotely from the boat, and connected to sound an appropriate alarm. The motion sensor and associated sonar transmitter and power supply may be contained in a small, watertight clip-on package for attachment to the anchor.

BRIEF DESCRIPTION OF THE DRAWINGS

FIG. 1 is a schematic diagram of the invention installed on a marine craft;

FIG. 2 is a schematic illustration, partially in block-diagram form, of the invention illustrated in FIG. 1;

DESCRIPTION OF THE PREFERRED EMBODIMENT

Figure 3:
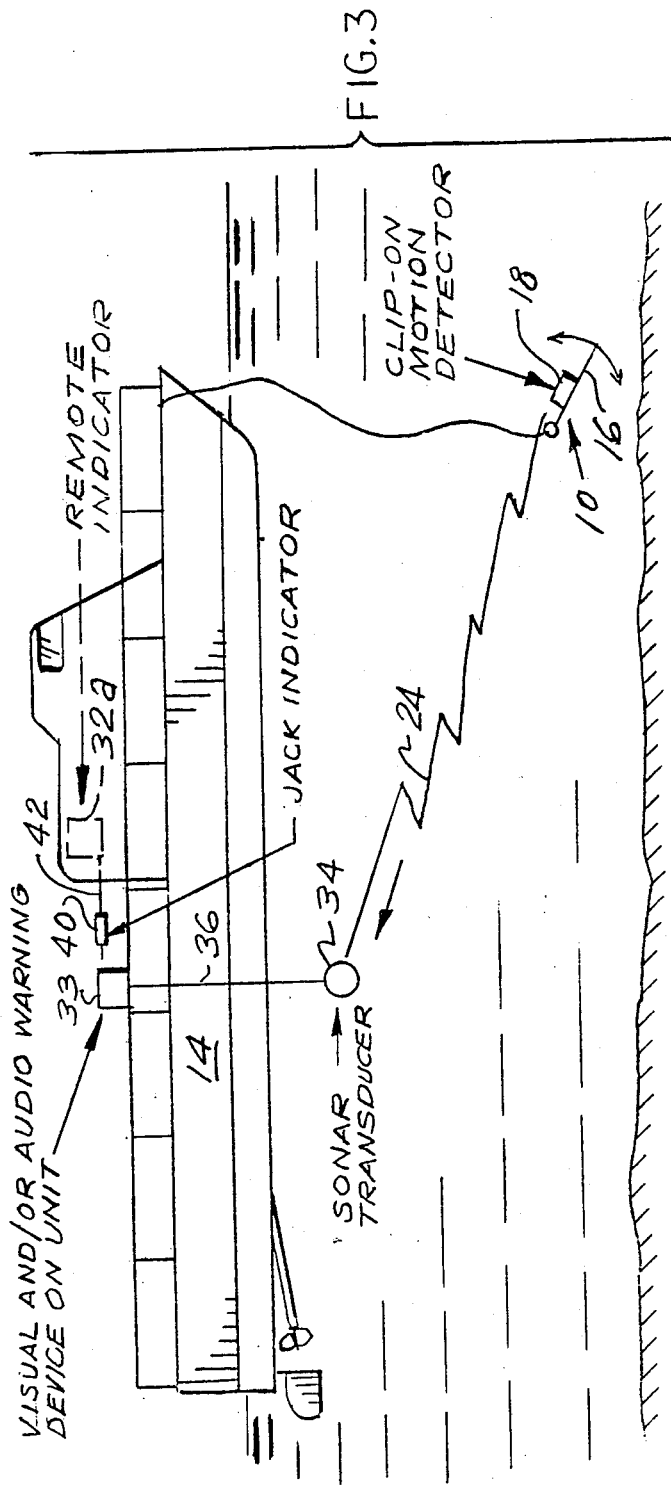
FIG. 3 is a schematic diagram of another embodiment of the invention instaled on a marine craft.

FIGS. 1 and 2 show a first embodiment of the invention, FIG. 1 being purely schematic and FIG. 2 showing the elements in block diagram form. In both Figures like numerals indicate the same elements.

Referring to FIGS. 1 and 2, an anchor 10 is attached via anchor line 12 to boat 14 in conventional fashion. Securely fastened to the shank 16 of anchor 10, or to any other convenient part, is a clip-on motion detector assembly 18 containing a motion detector 19. The motion detector 19 may be one of numerous types known in the prior art which will produce an electrical signal upon movement of the anchor 10, and may be of the type described in the referenced patents. The particular motion sensor used will, of course, depend on cost, size, electrical power requirements, and the type of motion to which the sensor is to respond. For example, some sensors respond to any movement, some to selected angular displacements or orientation, some to forces in selected directions above a preselected threshold, and yet others to sudden motions or accelerations above a threshold. Amplification of the electrical signal produced by the motion sensor 19 may be required.

Also incorporated as part of package 18 is the electrical power source for the motion sensor, which may be a simple 9 volt cadmium battery or the like, not shown. Package 18 also contains an electrically actuated pulse generator 20 such as an electronic multivibrator of the type known in the art, or a quartz crystal, one criterion being the frequency of the pulses produced by the pulse generator 20. It is preferred that the pulses be of a frequency compatible with acoustic transmitting transducer 21, to which the pulses are fed, and which produces acoustic waves 24 in the water. Transducer 21 is a vibrating device similar to a loudspeaker having a diaphragm which moves at the frequency of the input pulses thereto. A sound field is thus produced in the water, and the field propagates from the source in all directions, or as directed by directional devices which may be used. The motion initiated by the moving surface of the transducer 21 is communicated through adjoining water particles, and is identical to well known sonar devices. Thus, motion of the anchor 10 will cause generation of sonar signal 24 emanating from the location of the anchor.

The electrical components of the motion detector package 18, including any amplifiers and other necessary components, may be mounted or printed on a small circuit board. The transducer 21 may be a simple diaphragm on the surface of the motion detector assembly 18. Thus the entire motion detector assembly 18 may be a small, inexpensive package. The distance through which the sonar signal 24 must travel in the water is small, so that high power or expensive components are not needed.

Located on or below the waterline of the boat is a combination sonar receiver and RF transmitter assembly 23 containing an acoustic or sonar receiver 22, which may be a hydrophone or microphone-type component, for receiving the sonar signal 24 generated by acoustic transducer 21. The receiver 22 is tuned to the pulse frequency of the sonar signal, and need not be a wide-band device. Upon receipt of a sonar signal of the appropriate frequency, receiver 22 produces an electrical output signal which actuates an RF transmitter 26, and the RF transmitter 26 transmits through the air an electromagnetic radio wave 29 of a preselected wavelength. An assembly 28 which is a combination RF radio receiver 30 and audio and/or visual alarm or warning device 32 receives the RF signal and actuates a warning or alarm. The assembly 28 may be located on the boat 14 as shown or the RF radio wave may be of sufficient strength to be received at a distance from the boat 14, such as on shore. In either case, an alarm is sounded, and appropriate action may be taken to reset the anchor to prevent damage or injury. The alarm 32 may be audible or visible, or both. Radio frequency transmitters for short range transmissions, such as those used in garage door openers are well known, and do not generally require FCC licenses because of their low power. If a higher power transmitter is used, FCC regulations should be consulted to determine if registration is required.

Figure 4:
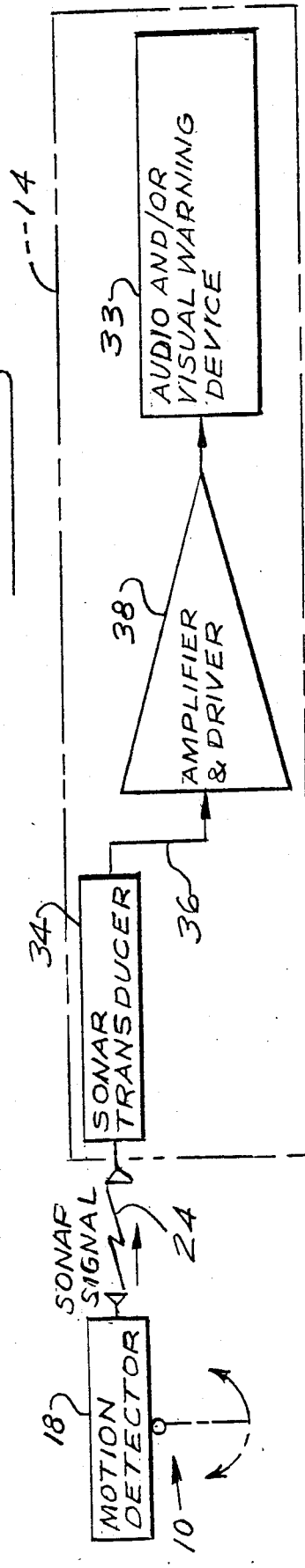
FIG. 4 is a schematic illustration, partially in block-diagram form, of the embodiment of the invention illustrated in FIG. 3.

An alternative boat alarm system is shown in FIGS. 3 and 4. After generation of the sonar signal 24 by motion detector package 18, the sonar signal is received by a sonar transducer-receiver 34 attached to or extending into the water from boat 14. Transducer 34 produces an electrical output signal which is fed via line 36, and through an amplifier and driver 38 associated with transducer 34, to warning or alarm device 33 mounted on boat 14. The system may also incorporate a remote warning or alarm device 32a which can also be actuated via jack 40 and line 42.

Sonar systems as described herein are well known in the art, and their components described in great detail in the literature. Sonar is an acronym for sound navigation ranging. Active sonar systems, also known as echo ranging systems, measure the time between generation and receipt of an acoustic echo from an object to measure distance. The system described herein is more of a passive sonar system of the type that has been used for communication between underwater vessels, but modulation of the transmitted acoustic wave is not required since only the presence of the sonar signal is sensed, and sophisticated directional, noise-suppression and other circuitry may be omitted. The system is thus a rudimentary sonar system with low power and narrow bandwidth, and can be constructed from well known, inexpensive and readily available components.

Although the invention has been described with respect to preferred embodiments thereof, it will be apparent to those skilled in the art that numerous changes and modifications may be made to the components and their operation without departing from the scope of the invention as hereinafter claimed.

What is claimed:

1. An alarm system for indicating movement of a boat's anchor in the water after deployment thereof comprising:
   (a) a motion sensor connected to said anchor and producing a motion signal upon movement of said anchor;
   (b) a sonar transmitter associated with said anchor;
   (c) means responsive to said motion signal for actuating said sonar transmitter and generating an acoustic wave which propagates through the water;
   (d) a sonar transducer mounted on the anchored boat suspended in the water for receiving said acoustic wave and for producing an output signal in response thereto;
   (e) an alarm means;
   (f) a radio frequency transmitter on the anchored boat actuated in response to said output signal for generating an electromagnetic radio wave in the atmosphere; and
   (g) a radio frequency receiver responsive to receipt of said electromagnetic radio wave for actuating said alarm means.

2. An alarm system as in claim 1 and further including:
   (a) an RF transmitter actuated in response to said output signal for generating an electromagnetic radio wave in the atmosphere; and
   (b) an RF receiver responsive to receipt of said electromagnetic radio wave for actuating said alarm means.

3. An alarm system as in claim 1 in which said sonar transmitter comprises:

(a) a pulse generator actuated in response to said motion signal for producing a series of electrical pulses; and, (b) an acoustic transducer responsive to said series of electrical pulses for generating said acoustic wave.

4. An alarm system as in claim 1 wherein said alarm means comprises an audible alarm apparatus.

5. An alarm system as in claim 1 wherein said alarm means comprises a visible alarm apparatus.

6. An alarm system for indicating movement of a boat's anchor in the water after deployment thereof comprising:

(a) a motion sensor connected to said anchor and producing a motion signal upon movement of said anchor;

(b) a sonar transmitter associated with said anchor and comprising:

(i) a pulse generator actuated in response to said motion signal for producing a series of electrical pulses; and (ii) an acoustic transducer responsive to said series of electrical pulses for generating an acoustic wave which propagates through the water;

(c) a sonar receiver mounted on the anchored boat suspended in the water for receiving said acoustic wave and for producing an output signal in response thereto; and (d) an alarm means actuateable in response to said output signal.

7. An alarm system according to claim 1 wherein the motion sensor is connected to a shank part of said anchor.

8. An alarm system according to claim 6 wherein said motion sensor is connected to a shank part of said anchor.

* * * * *